US010723255B2

(12) United States Patent
Plahuta

(10) Patent No.: US 10,723,255 B2
(45) Date of Patent: Jul. 28, 2020

(54) PROTECTED TIE DOWN STRAP

(71) Applicant: Matthew Plahuta, Castle Rock, CO (US)

(72) Inventor: Matthew Plahuta, Castle Rock, CO (US)

(*) Notice: Subject to any disclaimer, the term of this patent is extended or adjusted under 35 U.S.C. 154(b) by 181 days.

(21) Appl. No.: 15/975,762

(22) Filed: May 9, 2018

(65) Prior Publication Data
US 2018/0326892 A1 Nov. 15, 2018

Related U.S. Application Data

(60) Provisional application No. 62/503,927, filed on May 9, 2017.

(51) Int. Cl.
*B60P 7/08* (2006.01)
(52) U.S. Cl.
CPC .......... *B60P 7/083* (2013.01); *B60P 7/0823* (2013.01); *B60P 7/0846* (2013.01)
(58) Field of Classification Search
CPC ...... B65H 75/40; B65H 75/406; B65H 75/48; B60P 7/0846
See application file for complete search history.

(56) References Cited

U.S. PATENT DOCUMENTS

| 6,092,826 | A | * | 7/2000 | Pingel | B60D 1/18 |
| | | | | | 280/449 |
| 7,100,902 | B1 | | 9/2006 | Lu | |
| 7,942,360 | B2 | * | 5/2011 | Breeden | B60D 1/18 |
| | | | | | 242/378.1 |
| 8,684,390 | B1 | * | 4/2014 | Barrette | B60D 1/185 |
| | | | | | 242/370 |
| 8,973,222 | B2 | * | 3/2015 | Breeden | B60P 7/083 |
| | | | | | 24/68 CD |
| 9,540,200 | B2 | * | 1/2017 | Huang | B60D 1/185 |
| 9,840,183 | B2 | * | 12/2017 | Tolly | B64D 9/00 |
| 9,908,454 | B1 | * | 3/2018 | Waters, Jr. | B60P 7/0846 |
| 2004/0084558 | A1 | * | 5/2004 | Huang | B60P 7/0846 |
| | | | | | 242/385.4 |
| 2004/0094650 | A1 | * | 5/2004 | Huang | B60P 7/0846 |
| | | | | | 242/385.4 |

(Continued)

OTHER PUBLICATIONS

PCT/IB2018/000919: Written Opinion of the International Searching Authority.

(Continued)

*Primary Examiner* — Joshua T Kennedy
(74) *Attorney, Agent, or Firm* — Luke Charles Holst; McGrath North Mullin & Kratz, PC LLO

(57) ABSTRACT

A protected tie down strap encapsulates an adjustable tie down strap within a strap housing and includes a fixed tie down strap. An adjustment knob allows a user to turn the knob and take up slack in the adjustable tie down strap. The protected tie down strap utilizes a number of internal components including force plates, a power disc, washers, screw, shaft, etc. Together, they complete the complex task of tightening the tie down strap by powerfully wrapping it around the shaft in response to a user turning the adjustment knob. When the user wishes to release the tension on the tie down strap, he or she simply turns the adjustment knob the other direction (in other embodiments, he or she raises the adjustment knob up to release the strap and untie the load.)

15 Claims, 11 Drawing Sheets

(56) References Cited

U.S. PATENT DOCUMENTS

| | | |
|---|---|---|
| 2006/0196015 A1 | 9/2006 | Huang |
| 2007/0056146 A1 | 3/2007 | Madachy et al. |
| 2011/0064535 A1 | 3/2011 | Tardif et al. |
| 2011/0233493 A1 | 9/2011 | Huang |
| 2012/0233824 A1 | 9/2012 | Breeden et al. |
| 2015/0007422 A1 | 1/2015 | Cavanagh et al. |
| 2015/0191326 A1* | 7/2015 | Hall .......................... A42B 3/08 242/396.4 |
| 2016/0250961 A1 | 9/2016 | Tolly et al. |

OTHER PUBLICATIONS

PCT/IB2018/000919: International Search Report and References from International Bureau.

* cited by examiner

PROTECTED TIE DOWN STRAP

CROSS-REFERENCE TO RELATED APPLICATIONS

This application claims the benefit of U.S. Provisional Application No. 62/503,927 and filed on May 9, 2017 which is specifically incorporated by reference herein for all that it discloses and teaches.

TECHNICAL FIELD

The present invention relates generally to the field of straps, ropes, and tie-downs; more specifically, to a protected tie down strap.

BACKGROUND

The standard ratcheting strap has become a ubiquitous sight on the vehicles, trucks, trailers, etc. traveling on the highways and roads of North America. They can be found in most any hardware store, convenience store, and gas station. Ratchet straps are inexpensive and common, but they are far from easy to use. As the ratcheting mechanism is exposed to the elements, it weathers easily and quickly, causing an already tricky mechanical system to become corroded and even more difficult to manipulate. Additionally, the tag end of the strap is always in the way. And, if not properly secured before driving away, the tag end will whip in the wind and can mar items around it, the tag end can fray, etc.

What is needed is a simple, easy-to-use protected tie down strap that does not leave the mechanical components exposed to the elements, does not have an annoying and damaging tag end, and yet allows a user to adjust the length of the tie down and draw it tightly down with the ease of a simple turning motion.

BRIEF SUMMARY OF THE INVENTION

A protected tie down strap is designed to meet the above objectives in a clean, simple to use package. The exterior of the protected tie down strap is a study in simplicity, as it has only four visible components: the knurled adjustment knob, the strap housing, the fixed tie down strap and the adjustable tie down strap. However, once the adjustment knob and strap housing are removed, the internal components are visible and they are much more complex. The protected tie down strap utilizes a number of internal components including force plates, a power disc, washers, screw, shaft, power spring, bushings, spring clip, etc. Together, they complete the complex task of tightening the tie down strap by powerfully wrapping it around the shaft in response to a user turning the knurled adjustment knob. When the user wishes to release the tension on the tie down strap, he or she simply turns the adjustment knob the other direction (in other embodiments, he or she raises the adjustment knob up to release the strap and untie the load.)

DETAILED DESCRIPTION

Figure 1:
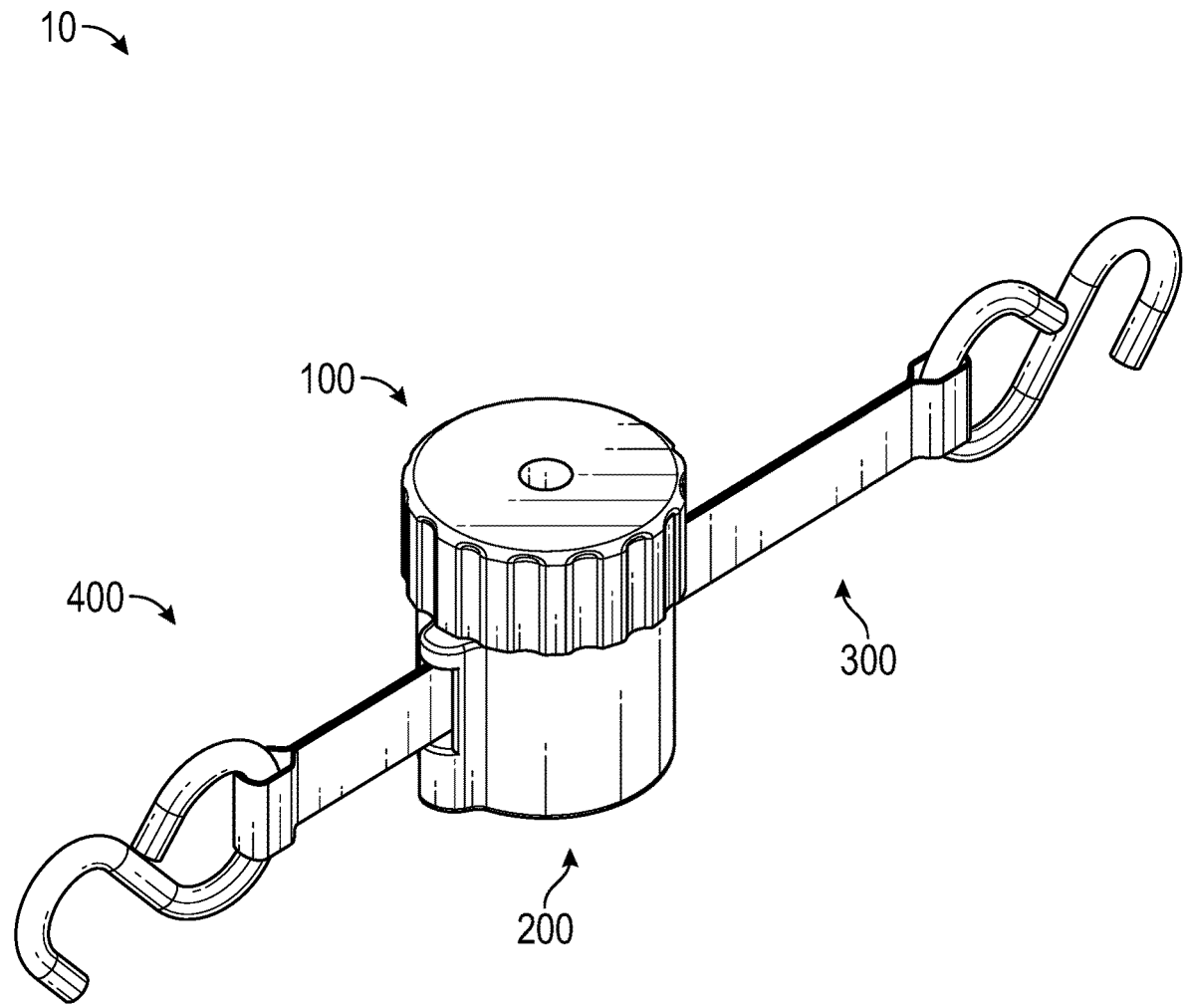
FIG. 1 illustrates a top and side perspective view of an exemplary embodiment of a protected tie down strap.

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples. Similarly, in this disclosure, language such as "could, should, may, might, must, have to, can, would, need to, is, is not", etc. and all such similar language shall be considered interchangeable whenever possible such that the scope of the invention is not unduly limited. For example, a comment such as: "item X is used" can be interpreted to read "item X can be used".

Exemplary embodiments are described below and in the accompanying Figures. The following detailed description provides a review of the drawing Figures in order to provide a thorough understanding of, and an enabling description for, these embodiments. One having ordinary skill in the art will understand that in some cases well-known structures and functions have not been shown or described in detail to avoid unnecessarily obscuring the description of the embodiments.

Referring now to the drawings, FIG. 1 illustrates a top and side perspective view of an exemplary embodiment of a protected tie down strap 10. The primary components visible in this view include the knurled adjustment knob 100, the strap housing 200, the fixed tie down strap 300 and the adjustable tie down strap 400.

To use the protected tie down strap 10, a user hooks the fixed tie down strap 300 on one tie down location and then, with the protected tie down strap adjusted to maximum length, hooks the adjustable tie down strap 400 to a second tie down location. The user then turns the adjustment knob 100 to wind up the excess adjustable tie down strap 400 material within the protected strap housing 200. When the strap no longer is loose and all slack has been taken up, the user can continue to turn the knob 100 to further tighten the protected tie down strap. Because of the mechanical advantage of the internal components, the user can tighten the strap significantly simply by turning the knob, a single large mechanical lever, common in externally exposed prior art ratchet straps, is not needed. Once the desired tension has been applied, the protected tie down strap is ready for travel, no tying down a tag end is required. When the user wishes to release the tension on the tie down strap, he or she simply turns the knob the other direction. In another embodiment, he or she adjusts the height of the adjustment knob to release the strap and untie the load. In one embodiment, the user presses down on the knob while turning, in another embodiment, the user lifts up on the knob while turning. In yet other embodiments, just turning the other direction is used, alternatively, no turning motion is necessary, just lifting up or pressing down will release the tension and create slack in the protected tie down strap 10.

Figure 2:
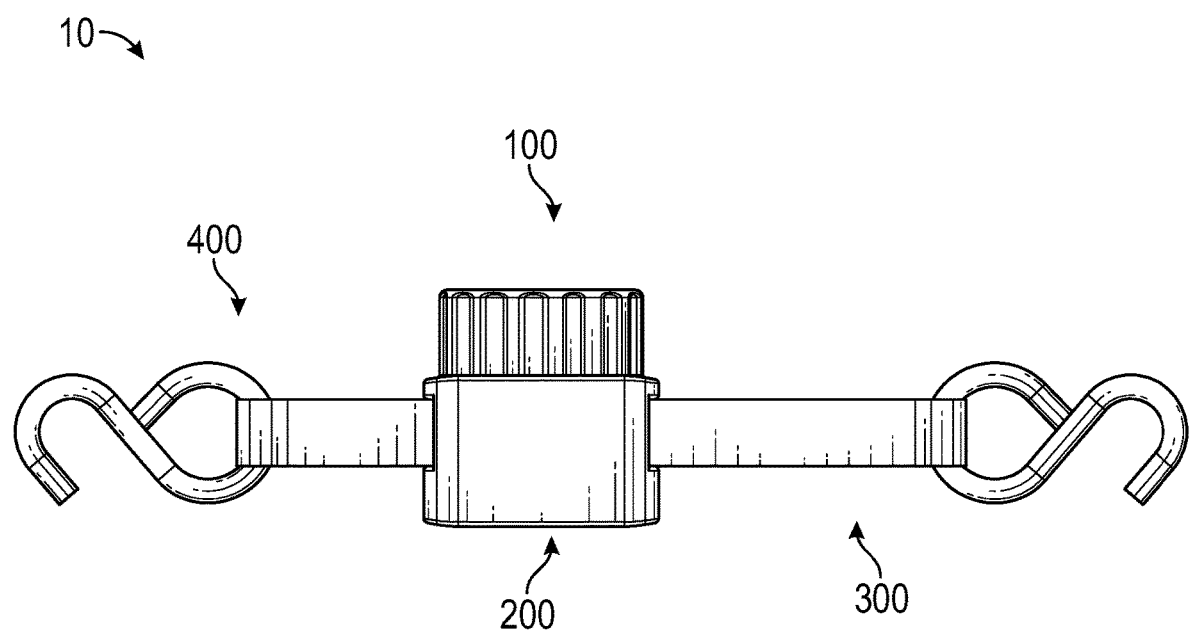
FIG. 2 illustrates a side elevation view of an exemplary embodiment of a protected tie down strap.

FIG. 2 illustrates a side elevation view of an exemplary embodiment of a protected tie down strap 10. The same components from FIG. 1 are illustrated here, but from a different perspective. Note the strap extends from each side of the strap housing 200. Although the tie down hooks are illustrated in FIG. 2 as being a type of S hook, other hook types and shapes are contemplated. Similarly, the hooks can be oriented up or down in other embodiments. In yet other embodiments, other types of attachments means besides hooks are contemplated (for example, magnets, latches, hook and loop material, sharply angled teeth, T brackets, etc. could all be used as needed).

Figure 3:
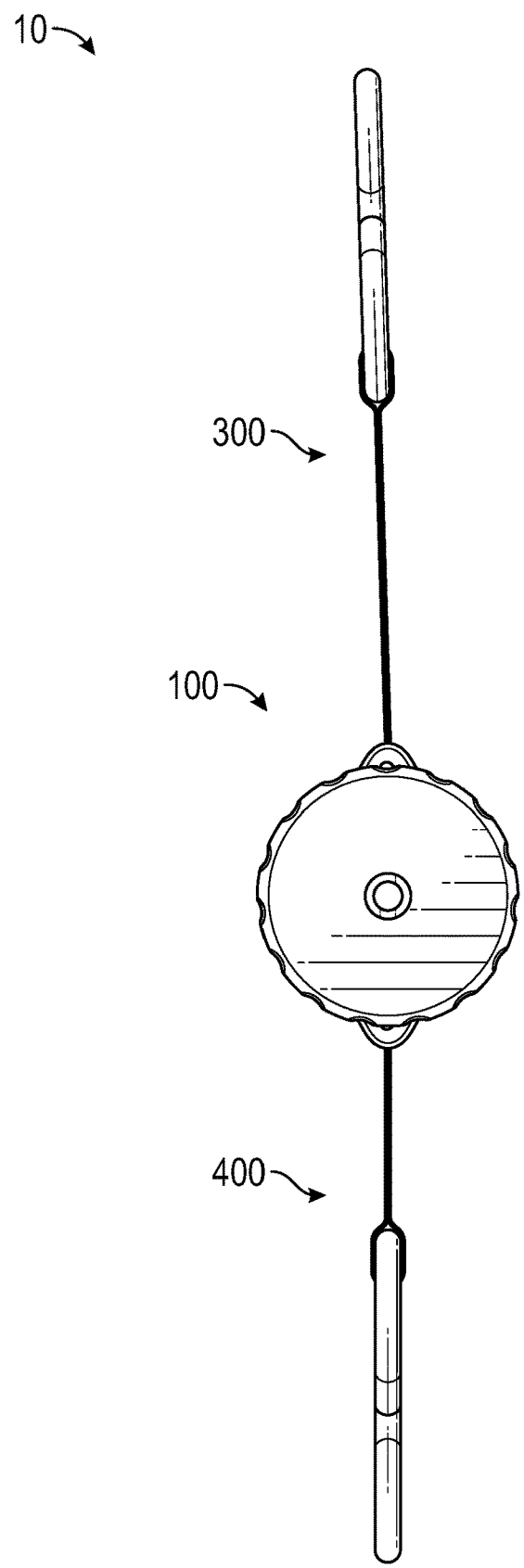
FIG. 3 illustrates a top plan view of an exemplary embodiment of a protected tie down strap.

FIG. 3 illustrates a top plan view of an exemplary embodiment of a protected tie down strap 10. The same external components are once again displayed in this view.

Figure 4:
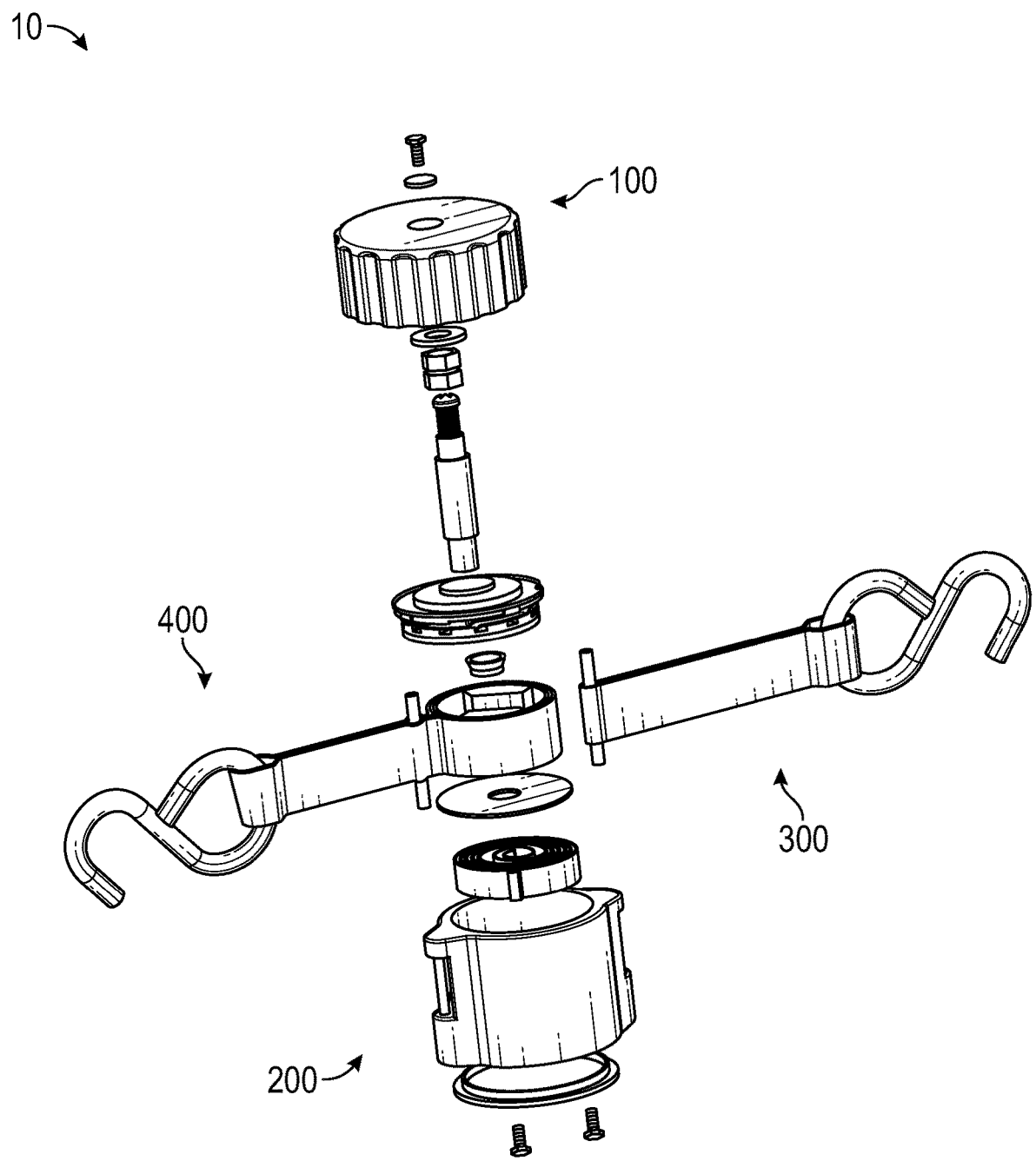
FIG. 4 illustrates a side exploded view of an exemplary embodiment of a protected tie down strap.

FIG. 4 illustrates a side exploded view of an exemplary embodiment of a protected tie down strap 10. In this view, a number of the internal components are shown in detail. However, for simplicity, they are not yet referenced by number or name, see later Figures for specifics. Generally, the internal components can comprise force plates, a power disc, washers, screw, shaft, power spring, bushings, spring clip, etc. Together, they complete the complex task of tightening the tie down strap by powerfully wrapping it around the shaft in response to a user turning the knurled adjustment knob.

Figure 5:
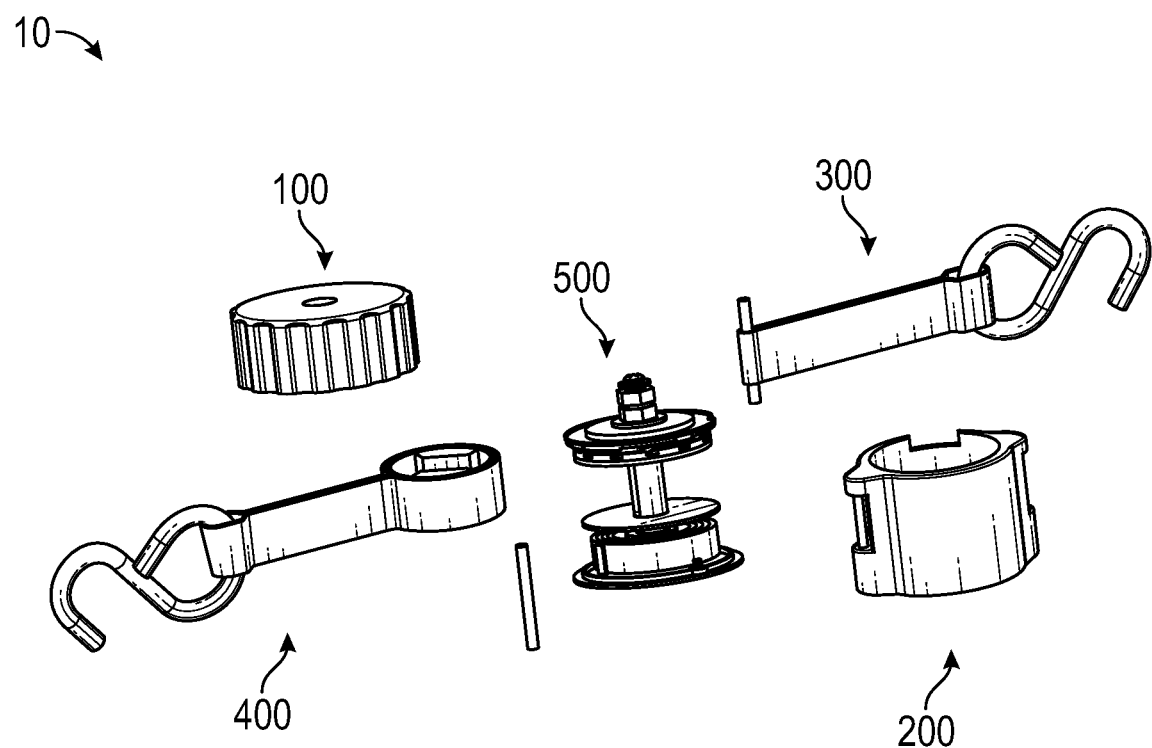
FIG. 5 illustrates a simplified side exploded view of an exemplary embodiment of a protected tie down strap.

FIG. 5 illustrates a simplified side exploded view of an exemplary embodiment of a protected tie down strap 10. In this view, a mechanical tensioning spool 500 is shown with the strap housing 200 removed. Two vertical lock pins are shown, one at the proximal end of the fixed tie down strap 300 and the other below the adjustable tie down strap 400. These pins lock the fixed tie down strap 300 in the housing 200 and help the adjustable strap roll smoothly in and out of the housing on the other side.

Figure 6:
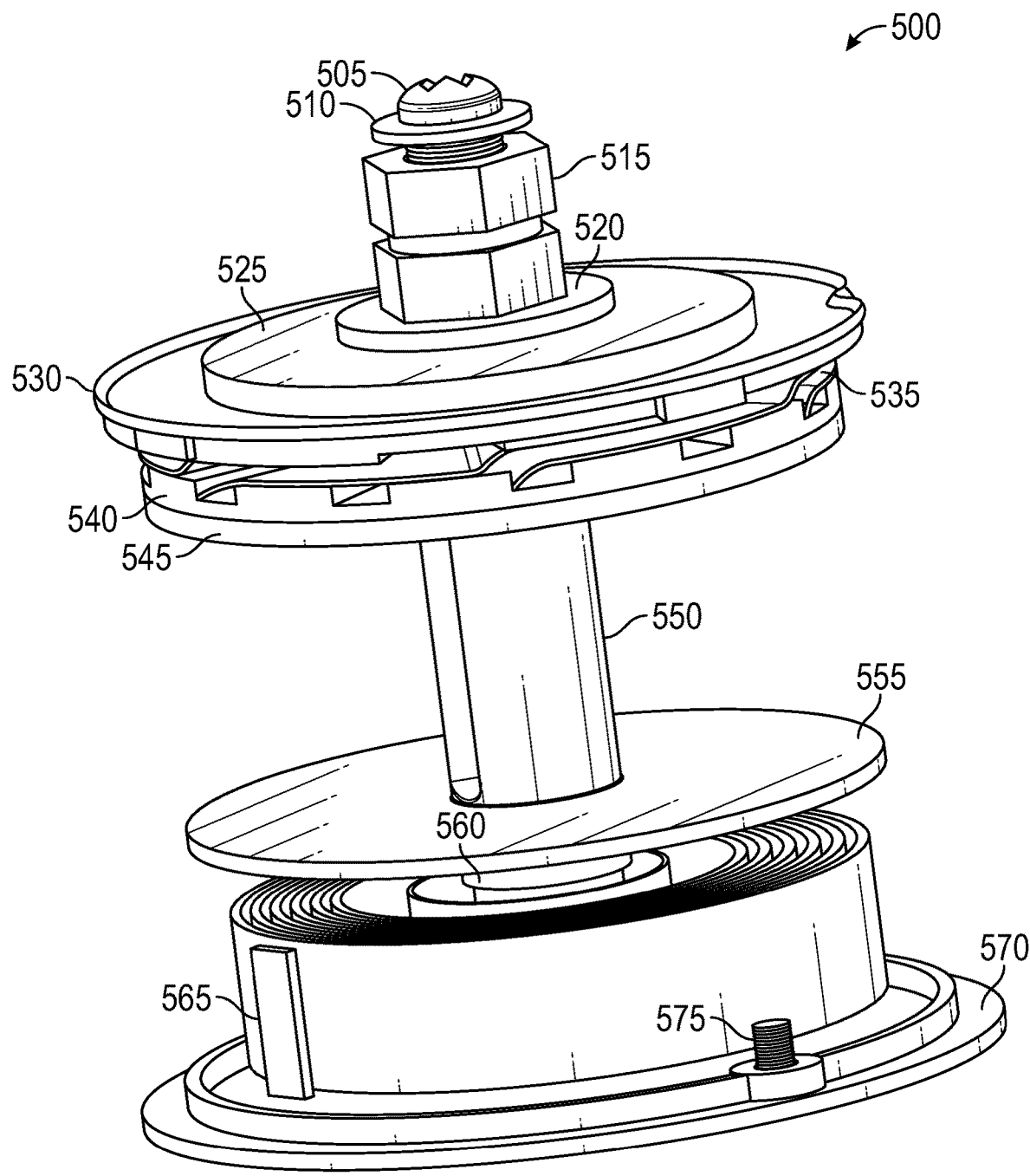
FIG. 6 illustrates a side view of an exemplary embodiment of a mechanical tensioning spool of a protected tie down strap.

FIG. 6 illustrates a side view of an exemplary embodiment of a mechanical tensioning spool 500 of a protected tie down strap 10. The spool utilizes a lock screw 505 and washer 510 to hold the tensioning knob 100 onto the shaft 550. Below this is a screw cap 515 above an upper bushing 520. Below the bushing is a top force plate 525 with a spring clip 530 to hold it in place. A power disc 535 below the top force plate 525 is driven to rotate by the top force plate turning and engaging the power disc as it rotates. A lower force plate 540 engages the underside of the power disc 535 and keeps it from rotating back the other direction due to the tension force on the strap. Each small turn of the top force plate advances the power disc 535 and causes the shaft 550 to rotate and wind up more of the adjustable strap. When the user wishes to release the tension on the strap, the knob is turned the other direction and the power disc rotates the other way and releases tension from the spool. The force plates allow the shaft to rotate the opposite direction to release the strap. In other embodiments, the roles of the upper and lower force places are reversed. In yet other embodiments, other means of accomplishing these actions can be utilized. Above and below the portion of the shaft 550 around which the strap is wound are a top spool plate 545 and a bottom spool plate 555. These plates guide the strap during its winding and unwinding operations and keep it in place. A lower bushing 560 is used between the bottom spool plate 555 and the power spring 565. The spring can assist in winding up the loose strap and otherwise providing tension in the mechanical tensioning spool 500. Below the spring is the bottom housing plate 570, it is attached to the strap housing sidewalls via the attachment screws 575.

Figure 7:
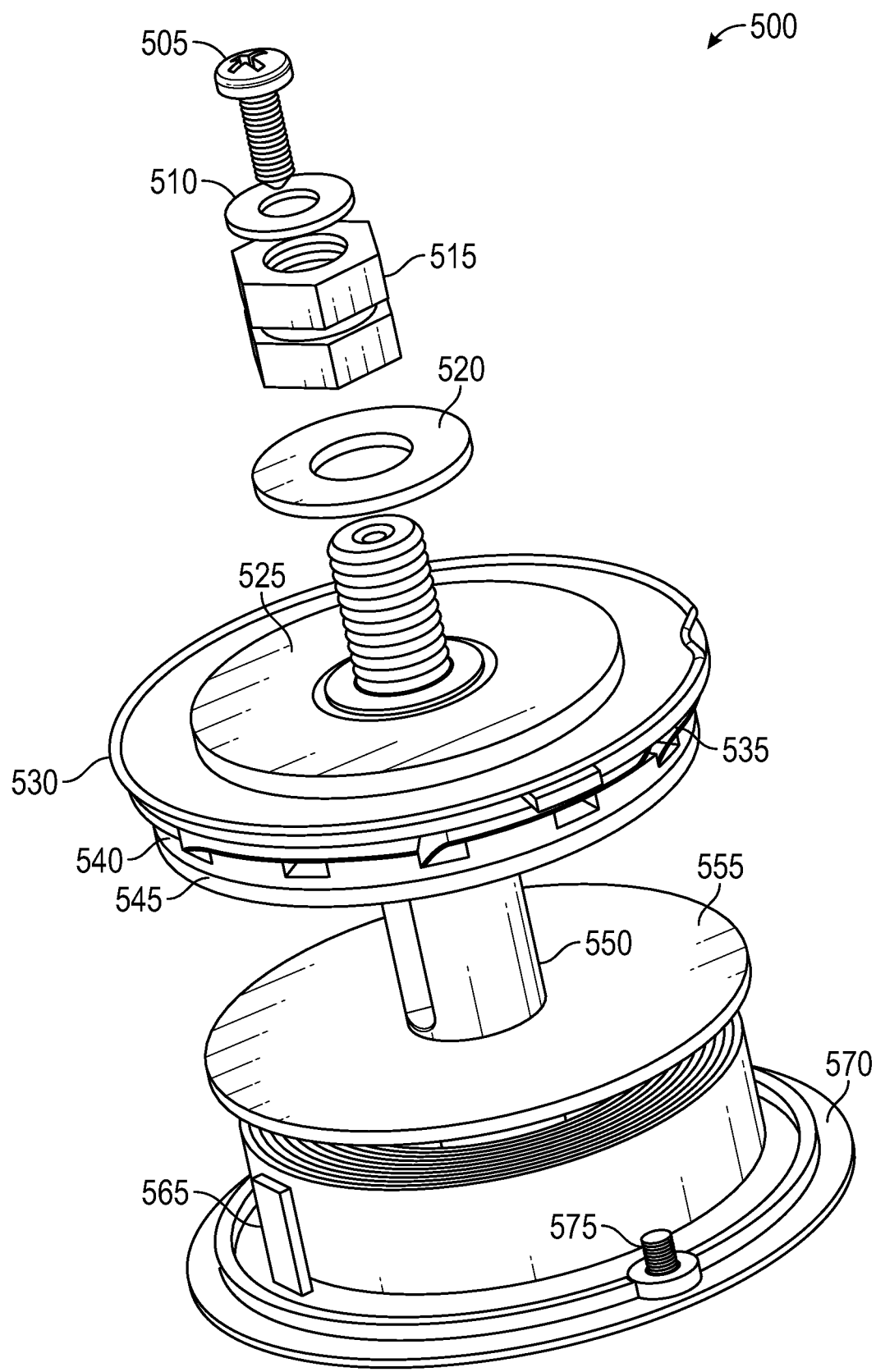
FIG. 7 illustrates a side exploded view of an exemplary embodiment of various components of a mechanical tensioning spool of a protected tie down strap.

FIG. 7 illustrates a side exploded view of an exemplary embodiment of various components of a mechanical tensioning spool 500 of a protected tie down strap. The components from FIG. 6 are illustrated in a different view to show detail.

Figure 8:
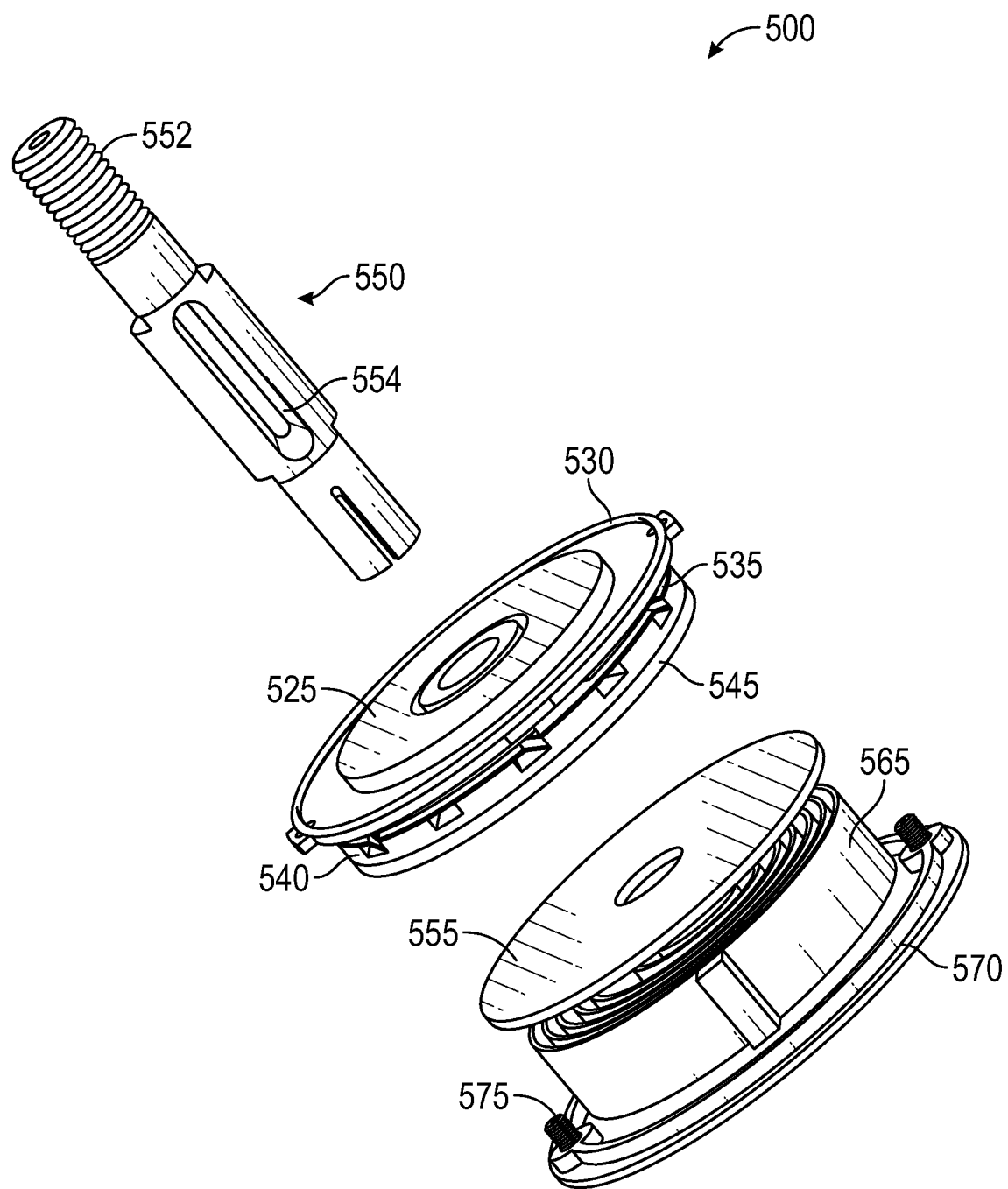
FIG. 8 illustrates a side exploded view of an exemplary embodiment of various components of a mechanical tensioning spool of a protected tie down strap.

FIG. 8 illustrates a side exploded view of an exemplary embodiment of various components of a mechanical tensioning spool 500 of a protected tie down strap. Note the shaft 550 is separated out so that the lock down threads 552 are visible. They attach the upper components (see other Figures) to the shaft. Note also the strap winding spool portion 554. The strap fits through the port in the spool portion 554 and then is wound therearound.

Figure 9:
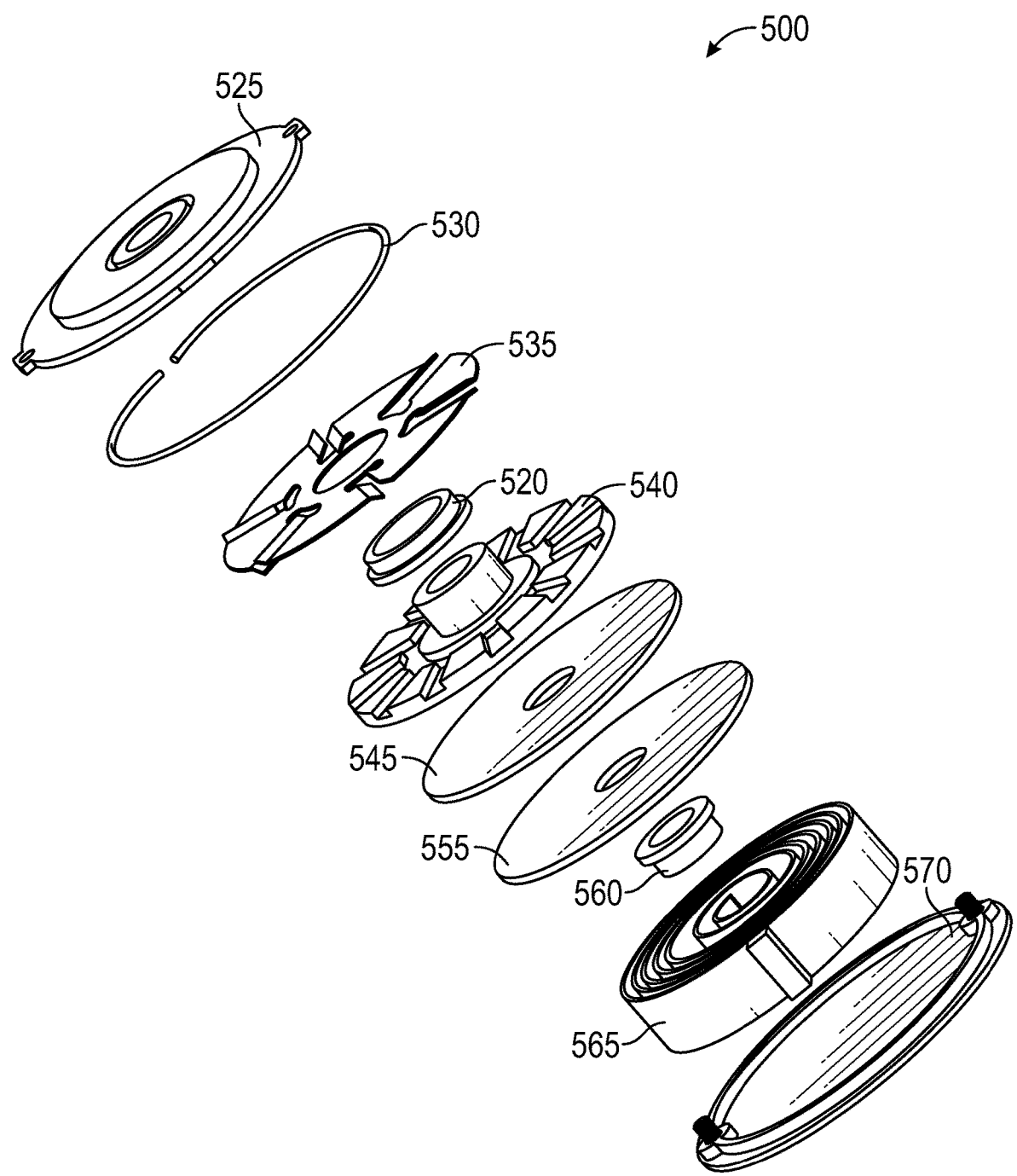
FIG. 9 illustrates a side exploded view of an exemplary embodiment of various components of a mechanical tensioning spool of a protected tie down strap.

FIG. 9 illustrates a side exploded view of an exemplary embodiment of various components of a mechanical tensioning spool 500 of a protected tie down strap. Note the locking flanges extending upwards and downwards from the power disc 535. These engage with the protrusions on the upper and lower force plates. They are shaped so that a flange can slide over a raised portion and then drop down into a lock channel to hold the spool in place. Once the power disc 535 is raised so that the flange can not engage into the lock channel, the spool is released.

Figure 10:
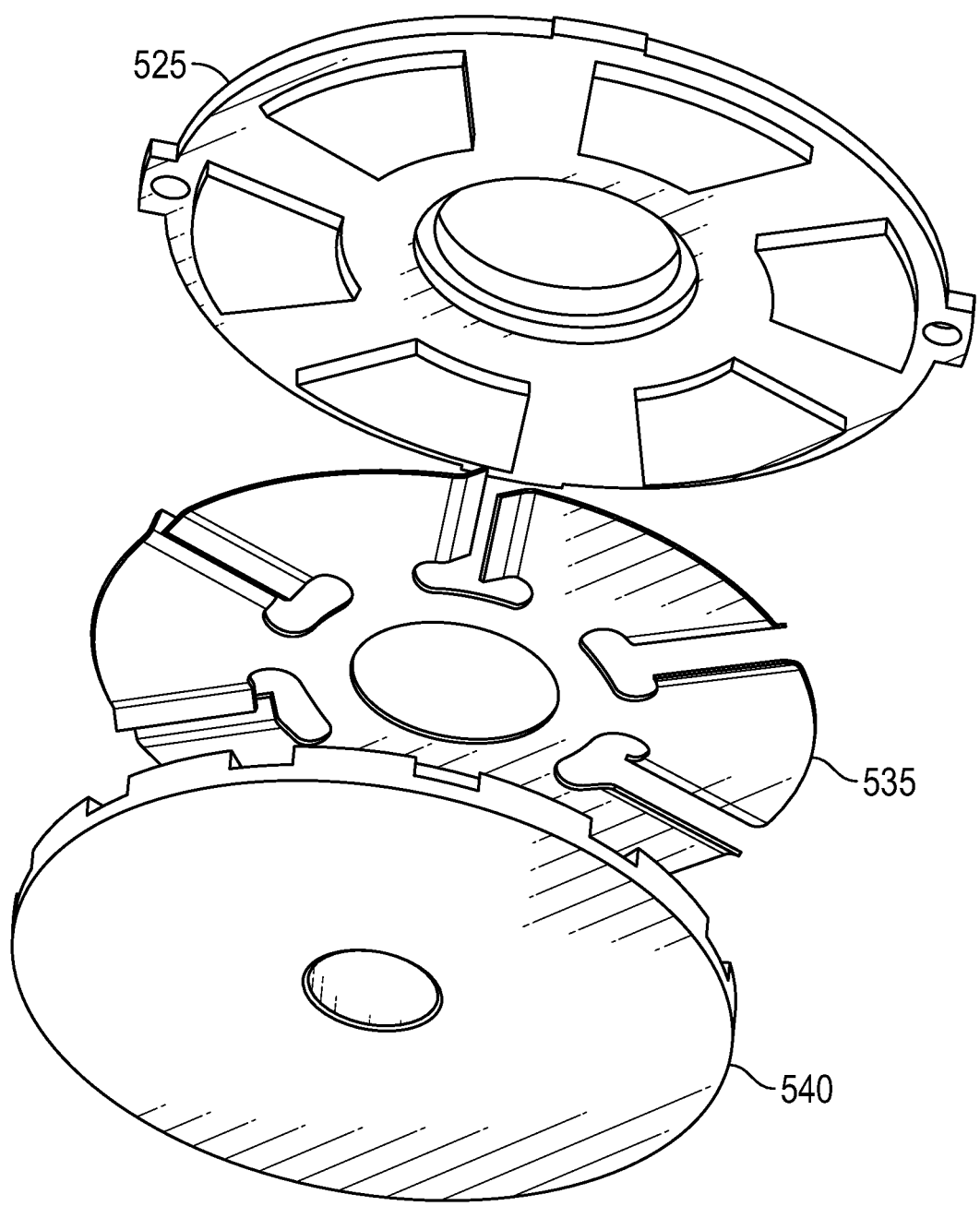
FIG. 10 illustrates a side exploded view of an exemplary embodiment of various components of a mechanical tensioning spool of a protected tie down strap.

FIG. 10 illustrates a side exploded view of an exemplary embodiment of various components of a mechanical tensioning spool 500 of a protected tie down strap. This view provides a zoomed-in detail of the protrusions and channels therebetween on the underside of the top force plate 525. Compare these to those on the topside of the lower force plate 540. Also shown in detail is the power disc 535 and the locking flanges thereof.

Figure 11:
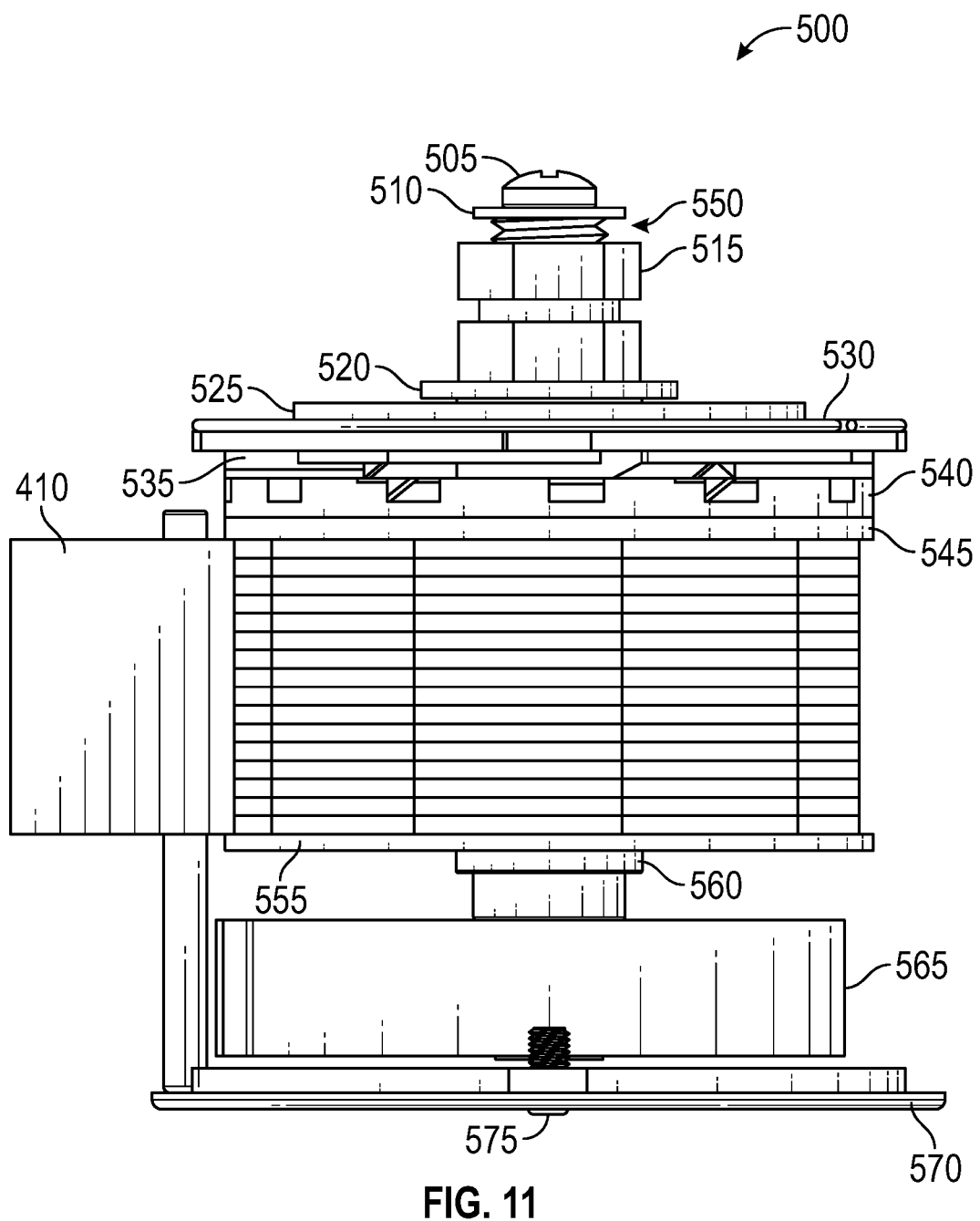
FIG. 11 illustrates a side elevation view of an exemplary embodiment of various components of a mechanical tensioning spool of a protected tie down strap.

FIG. 11 illustrates a side elevation view of an exemplary embodiment of various components of a mechanical tensioning spool 500 of a protected tie down strap. The components are as listed above, but this view shows them in location and provides a different perspective to show the components interacting with each other in more detail.

The above specification, examples and data provide a description of the structure and use of exemplary implementations of the described systems, articles of manufacture and methods. It is important to note that many implementations can be made without departing from the spirit and scope of the invention.

What is claimed is:

1. A tie down strap for securing a load, the tie down strap comprising:
   a housing;
   a fixed strap extending from a first side of the housing;
   an adjustable strap extending from an opposite second side of the housing;
   an adjustment knob on the housing;
   a tensioning spool inside the housing, the tensioning spool comprising:
   a) a shaft connected to the adjustment knob;
   b) the shaft comprising a strap winding spool portion;

c) the adjustable strap connected to the shaft at the strap winding spool portion;
d) a top force plate connected to the shaft;
e) a lower force plate connected to the shaft and located below the top force plate;
f) a power disc connected to the shaft and located between the top force plate and the lower force plate;
g) a top spool plate;
h) a bottom spool plate;
i) the top spool plate and bottom spool plate configured to guide the adjustable strap as it winds and unwinds around the strap winding spool portion of the shaft;
the adjustment knob configured to turn in a first direction;
the top force plate configured to rotate in the first direction as the adjustment knob is turned in the first direction;
the top force plate configured to engage and rotate the power disc in the first direction as the top force plate is rotated by the turn of the adjustment knob;
the power disc configured to wind the adjustable strap around the shaft winding spool portion of the shaft as the power disc is rotated in the first direction to increase tension on the adjustable strap;
the top force plate and the lower force plate configured to engage the power disc to hold the adjustable strap in position when the adjustment knob is not being turned;
the adjustment knob configured to operate in coordination with the tensioning spool to tighten or loosen the adjustable strap to secure or release a load; and
the housing configured to protect the tensioning spool from outside elements.

2. The tie down strap of claim 1, further comprising:
the adjustment knob configured to turn in an opposite second direction;
the top force plate configured to rotate in the second direction as the adjustment knob is turned in the second direction;
the top force plate configured to engage and rotate the power disc in the second direction as the top force plate is rotated by the turn of the adjustment knob; and
the power disc configured to unwind the adjustable strap around the shaft winding spool portion of the shaft as the power disc is rotated in the second direction to decrease tension on the adjustable strap.

3. The tie down strap of claim 2, further comprising:
the top force plate and the lower force plate comprising a plurality of protrusions;
the top force plate and the lower force plate comprising a plurality of channels;
the power disc comprising a plurality of locking flanges;
the plurality of locking flanges configured to engage with the plurality of protrusions of the top force plate and the lower force plate; and
wherein the engagement of the locking flanges with the plurality of protrusions hold the adjustable strap in position when the adjustment knob is not being turned.

4. The tie down strap of claim 1, wherein the tie down strap does not comprise a lever.

5. A tie down strap for securing a load, the tie down strap comprising:
a housing;
a fixed strap extending from the housing;
an adjustable strap extending from the housing;
an adjustment knob on the housing;
a tensioning spool inside the housing, the tensioning spool comprising:
a) a shaft connected to the adjustment knob;
b) the shaft comprising a strap winding spool portion;
c) the adjustable strap connected to the shaft at the strap winding spool portion;
d) a top force plate connected to the shaft;
e) a lower force plate connected to the shaft;
f) a power disc connected to the shaft;
the adjustment knob configured to turn in a first direction;
the top force plate configured to rotate in the first direction as the adjustment knob is turned in the first direction;
the top force plate configured to engage and rotate the power disc in the first direction as the top force plate is rotated by the turn of the adjustment knob;
the power disc configured to wind the adjustable strap around the shaft winding spool portion of the shaft as the power disc is rotated in the first direction to increase tension on the adjustable strap; and
the top force plate and the lower force plate configured to engage the power disc to hold the adjustable strap in position when the adjustment knob is not being turned.

6. The tie down strap of claim 5, further comprising:
the adjustment knob configured to turn in an opposite second direction;
the top force plate configured to rotate in the second direction as the adjustment knob is turned in the second direction;
the top force plate configured to engage and rotate the power disc in the second direction as the top force plate is rotated by the turn of the adjustment knob; and
the power disc configured to unwind the adjustable strap around the shaft winding spool portion of the shaft as the power disc is rotated in the second direction to decrease tension on the adjustable strap.

7. The tie down strap of claim 6, further comprising:
the top force plate and the lower force plate comprising a plurality of protrusions;
the top force plate and the lower force plate comprising a plurality of channels;
the power disc comprising a plurality of locking flanges;
the plurality of locking flanges configured to engage with the plurality of protrusions of the top force plate and the lower force plate; and
wherein the engagement of the locking flanges with the plurality of protrusions hold the adjustable strap in position when the adjustment knob is not being turned.

8. The tie down strap of claim 7, the tensioning spool further comprising:
a top spool plate;
a bottom spool plate;
the top spool plate and the bottom spool plate configured to guide the adjustable strap as it winds and unwinds around the strap winding spool portion of the shaft;
an optional power spring; and
the optional power spring configured to provide tension to assist with winding the adjustable strap around the strap winding spool portion of the shaft.

9. The tie down strap of claim 5, further comprising:
the fixed strap extending from a first side of the housing; and
the adjustable strap extending from an opposite second side of the housing.

10. The tie down strap of claim 5, further comprising:
at least one vertical lock pin;
the at least one vertical lock pin configured to connect the fixed strap to the housing; and
the at least one vertical lock pin configured to assist with guiding the adjustable strap in and out of the housing.

11. The tie down strap of claim 5, wherein the tie down strap does not comprise a lever.

12. The tie down strap of claim 5, wherein the housing is configured to protect the tensioning spool from outside elements.

13. The tie down strap of claim 5, further comprising:
a means of attachment on one end of the fixed strap extending from the housing;
a means of attachment on one end of the adjustable strap extending from the housing; and
the means of attachment configured to attach the tie down strap to a load for securement;
wherein the means of attachment include hooks, S hooks, magnets, latches, hook and loop material, sharply angled teeth, T brackets, or combinations thereof.

14. A method of using a tie down strap, comprising:
providing a load in need of securement;
providing a tie down strap, the tie down strap comprising:
a) a housing;
b) a fixed strap extending from the housing;
c) an adjustable strap extending from the housing;
d) a means of attachment on one end of the fixed strap extending from the housing;
e) a means of attachment on one end of the adjustable strap extending from the housing;
f) the means of attachment configured to attach the tie down strap to the load for securement, wherein the means of attachment include hooks, S hooks, magnets, latches, hook and loop material, sharply angled teeth, T brackets, or combinations thereof;
g) an adjustment knob on the housing;
h) a tensioning spool inside the housing, the tensioning spool comprising:
i) a shaft connected to the adjustment knob;
ii) the shaft comprising a strap winding spool portion;
iii) the adjustable strap connected to the shaft at the strap winding spool portion;
iv) a top force plate connected to the shaft;
v) a lower force plate connected to the shaft;
vi) a power disc connected to the shaft;

attaching the means of attachment of the fixed strap to a first tie down location;
adjusting the adjustable strap to a maximum length;
attaching the means of attachment of the adjustable strap to a second tie down location;
turning the adjustment knob in a first direction to tighten the adjustable strap to secure the load;
the top force plate rotating in the first direction as the adjustment knob is turned in the first direction;
the top force plate engaging and rotating the power disc in the first direction as the top force plate is rotated by the turn of the adjustment knob;
the power disc winding the adjustable strap around the shaft winding spool portion of the shaft as the power disc is rotated in the first direction to increase tension on the adjustable strap;
the top force plate and the lower force plate engaging the power disc to hold the adjustable strap in position when the adjustment knob is not being turned;
turning the adjustment knob in a second direction to loosen the adjustable strap to release the load;
removing the means of attachment of the adjustable strap from the second tie down location;
removing the means of attachment of the fixed strap from the first tie down location; and
turning the adjustment knob in the first direction to collect the adjustable strap in the housing for storage purposes.

15. The method of claim 14, further comprising:
the top force plate rotating in the second direction as the adjustment knob is turned in the second direction;
the top force plate engaging and rotating the power disc in the second direction as the top force plate is rotated by the turn of the adjustment knob; and
the power disc unwinding the adjustable strap around the shaft winding spool portion of the shaft as the power disc is rotated in the second direction to decrease tension on the adjustable strap.

* * * * *